United States Patent
Talagala et al.

(10) Patent No.: US 7,103,811 B2
(45) Date of Patent: Sep. 5, 2006

(54) MECHANISMS FOR DETECTING SILENT ERRORS IN STREAMING MEDIA DEVICES

(75) Inventors: Nisha D. Talagala, Fremont, CA (US); Brian Wong, Palo Alto, CA (US)

(73) Assignee: Sun Microsystems, Inc, Santa Clara, CA (US)

(*) Notice: Subject to any disclaimer, the term of this patent is extended or adjusted under 35 U.S.C. 154(b) by 426 days.

(21) Appl. No.: 10/328,792

(22) Filed: Dec. 23, 2002

(65) Prior Publication Data

US 2004/0123202 A1  Jun. 24, 2004

(51) Int. Cl.
  G11C 29/00 (2006.01)
  G08C 25/00 (2006.01)
  H04L 1/08 (2006.01)
  G11B 7/00 (2006.01)

(52) U.S. Cl. ............... 714/718; 714/799; 714/822; 369/53.35

(58) Field of Classification Search ........... 714/718, 714/723, 746, 752, 753, 758, 763, 768–771, 714/799–800, 805, 819, 820, 701, 702, 42, 714/52, 48; 365/230.01, 230.03; 711/200, 711/203, 204, 213
See application file for complete search history.

(56) References Cited

U.S. PATENT DOCUMENTS

| | | | |
|---|---|---|---|
| 5,197,148 A | 3/1993 | Blount et al. | |
| 5,201,044 A | 4/1993 | Frey et al. | |
| 5,206,939 A | 4/1993 | Yanai et al. | |
| 5,720,026 A | 2/1998 | Uemura et al. | |
| 5,796,934 A | 8/1998 | Bhanot et al. | |
| 5,889,934 A | 3/1999 | Peterson | |
| 5,995,308 A | 11/1999 | Assouad et al. | |
| 6,009,542 A * | 12/1999 | Koller et al. | 714/53 |
| 6,343,343 B1 | 1/2002 | Menon et al. | |
| 6,347,359 B1 | 2/2002 | Smith et al. | |
| 6,397,309 B1 | 5/2002 | Kedem et al. | |
| 6,408,416 B1 | 6/2002 | Morley et al. | |
| 6,418,519 B1 | 7/2002 | Cadden et al. | |
| 6,467,060 B1 * | 10/2002 | Malakapalli et al. | 714/758 |
| 6,484,185 B1 | 11/2002 | Jain et al. | |
| 6,553,511 B1 | 4/2003 | DeKoning et al. | |
| 6,584,544 B1 | 6/2003 | Morley et al. | |
| 6,587,962 B1 | 7/2003 | Hepner et al. | |
| 6,606,629 B1 | 8/2003 | DeKoning et al. | |
| 6,629,273 B1 | 9/2003 | Patterson | |
| 6,684,289 B1 | 1/2004 | Gonzalez et al. | |
| 6,687,791 B1 | 2/2004 | Morrison | |

(Continued)

OTHER PUBLICATIONS

EMC, "The EMC CLARiiON Data Integrity Difference", (May 2001), pp. 1-11.

Primary Examiner—Christine T. Tu
(74) Attorney, Agent, or Firm—Blakely Sokoloff Taylor & Zafman LLP

(57) ABSTRACT

A method for detecting errors in streaming media devices is described. In one embodiment, when a command to write a block of data to a streaming media device is received, integrity metadata associated with the data block is attached to the data block and written to the streaming media device together with the data block. Subsequently, when a read command pertaining to this data block is received, new integrity metadata is determined and compared to the attached metadata. If the new integrity metadata does not match the attached metadata, an error message is generated.

28 Claims, 5 Drawing Sheets

U.S. PATENT DOCUMENTS

| | | |
|---|---|---|
| 6,728,922 B1 * | 4/2004 | Sundaram et al. .......... 714/769 |
| 6,874,001 B1 | 3/2005 | Narang et al. |
| 6,880,060 B1 | 4/2005 | Talagala et al. |
| 2003/0070042 A1 | 4/2003 | Byrd |
| 2003/0140299 A1 * | 7/2003 | Duncan et al. ............. 714/763 |
| 2003/0145270 A1 | 7/2003 | Holt et al. |
| 2003/0163777 A1 | 8/2003 | Holt |
| 2003/0188216 A1 | 10/2003 | Elko et al. |
| 2003/0221155 A1 * | 11/2003 | Weibel et al. .............. 714/752 |
| 2004/0123032 A1 | 6/2004 | Talagala et al. |
| 2004/0153746 A1 | 8/2004 | Talagala et al. |

* cited by examiner

MECHANISMS FOR DETECTING SILENT ERRORS IN STREAMING MEDIA DEVICES

FIELD OF THE INVENTION

This invention relates generally to data storage systems and more particular to a mechanism for detecting silent errors in streaming media devices.

BACKGROUND OF THE INVENTION

Data storage systems can occasionally corrupt data. These corruptions occur for several reasons. For example, firmware bugs, unprotected cache memories, bus errors can cause bits in data blocks to be modified. Such errors are "silent" because the data storage system does not realize that the error has occurred. Silent data corruption may create significant problems. For example, when an application requests data and gets the wrong data, the application may crash, or alternatively, the application may pass along the corrupted data to other applications.

Silent data corruption is especially troublesome when it occurs in streaming media devices such as tapes. The streaming media devices, traditionally used for backup, are typically written once and not read again until an emergency occurs. If a streaming media device suffers a silent data corruption, systems that will subsequently use backup copies retrieved from the affected tape to recover data may from then on be unknowingly operating on corrupted data. Such situations may have disastrous consequences (e.g., irreparable undetected long-term data corruption).

SUMMARY OF THE INVENTION

The present invention relates to various aspects for detecting errors in data storage devices.

In one aspect of the invention, when a command to write a block of data to a streaming media device is received, integrity metadata associated with the data block is attached to the data block and written to the streaming media device together with the data block. Subsequently, when a read command pertaining to this data block is received, new integrity metadata is determined and compared to the attached metadata. If the new integrity metadata does not match the attached metadata, an error message is generated.

According to another aspect of the present invention, a set of integrity metadata is determined for a data block being written to a storage medium. Each integrity metadata within the set of integrity metadata corresponds to a particular portion of the data block. The set of integrity metadata is attached to the data block and written to the storage medium. Upon receiving a read command, the attached set of integrity metadata is used to check whether any portion of the data block is corrupted.

BRIEF DESCRIPTION OF THE DRAWINGS

The present invention is illustrated by way of example, and not limitation, by the figures of the accompanying drawings in which like references indicate similar elements and in which.

DETAILED DESCRIPTION

As will be discussed in more detail below, an embodiment of the present invention provides a method for detecting errors in streaming media devices. In accordance with one embodiment, when a command to write a block of data to a streaming media device is received, integrity metadata associated with this data block is attached to the data block and written to the streaming media device together with the data block. Subsequently, when a read command pertaining to this data block is received, new integrity metadata is determined and compared to the attached metadata. If the new integrity metadata does not match the attached metadata, an error message is generated.

In another embodiment, a method is provided for detecting errors in data storage devices. The method includes determining a set of integrity metadata for a data block being written to a storage medium. Each integrity metadata within the set of integrity metadata corresponds to a particular portion of the data block. The set of integrity metadata is attached to the data block and written to the storage medium. Upon receiving a read command, the attached set of integrity metadata is used to determine whether any portion of the data block is corrupted.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Figure 1:
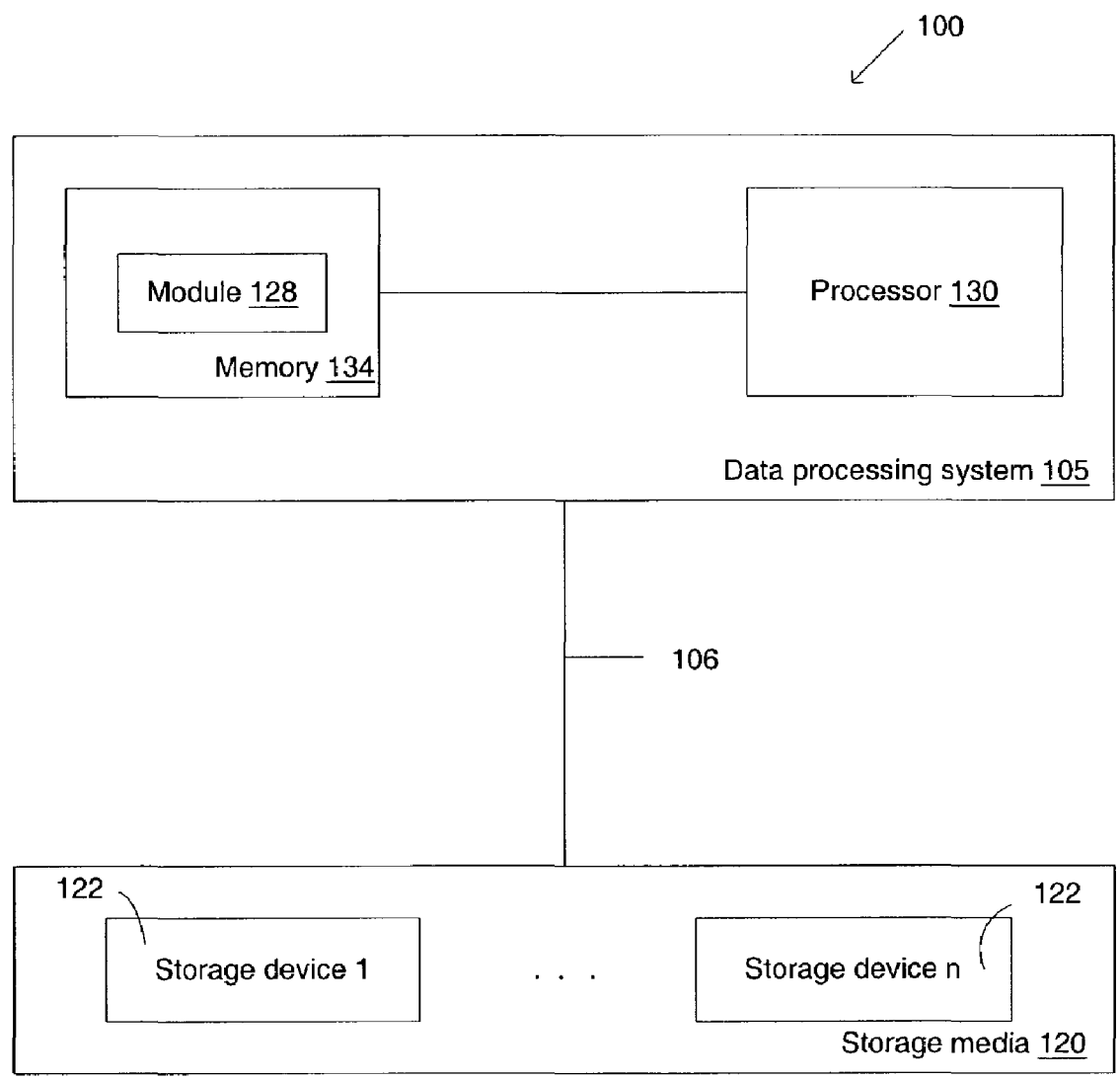
FIG. 1 illustrate an exemplary data storage system in accordance with one embodiment of the present invention.

FIG. 1 illustrates an exemplary data storage system in accordance with one embodiment of the present invention. Referring to FIG. 1, a data storage system 100 contains storage media 120 and a data processing system 105. Storage media 120 comprises one or more storage devices 122. In particular, storage devices may be streaming media devices such as tapes or virtual tapes (i.e., storage devices that manage data in such a manner that the data located partially or entirely in hard disk storage appears to be stored entirely on tape cartridges).

Data processing system 105 may be a backup host machine, a server or any other device external to the storage media 120 within the block-based portion of the I/O datapath. The datapath referred to herein represents any software, hardware, or other entities that manipulate data in block form (i.e., from the time the data enters block form on write operations to the point where the data leaves block form on read operations). The datapath extends from the computer that reads or writes the data (converting it into block form) to the storage device where the data resides during storage. For example, the datapath may include software modules such as volume managers that stripe or replicate the data, the storage devices that store the data blocks, the portion of the file system that manages data in blocks, the network that transfers the blocks, etc.

Users of data storage system 100 may be connected to data processing system 105 directly or via a network such as a local area network or a storage array network. Storage media 120 communicates with data processing system 105 via an interconnect 106 that may be a standard bus for communicating information and signals (e.g., SCSI, fibre channel, etc.). Tape drives 122 are capable of responding to read and write commands from computer 105.

Computer 105 includes memory 134 and processor 130, as well as other devices. In one embodiment, memory 134 stores software module 128 and other program code that can be executed by processor 130. Memory 134 may be RAM or some other machine-readable medium. The machine-readable medium may include a mechanism that provides (i.e., stores and/or transmits) information in a form readable by a machine such as a computer or digital processing device. For example, a machine-readable medium may include a read only memory (ROM), random access memory (RAM), magnetic disk storage media, optical storage media, flash memory devices, etc. The code or instructions may be represented by carrier-wave signals, infrared signals, digital signals, and by other like signals.

In another embodiment, module 128 may be implemented in tape drive 122, or anywhere else outside of the computer 105 on the I/O datapath (e.g., a virtual tape device).

In yet another embodiment, module 128 may consist of two modules residing remotely from each other (e.g., the first module may be implemented in memory 134 of computer 105 and the second module may be implemented in tape drive 122).

Tape storage devices within storage media 120 store data in blocks. The length of a data block may vary for different tapes (e.g., 512 bytes, 4 kilobytes, etc.). For each tape, the length of a data block is recorded in the tape header. Each data block includes embedded integrity metadata that enables detection of errors in the storage media 120. Integrity metadata may include a logical block address to verify the location of the data block and/or a checksum to verify the contents of the data block. A checksum is a numerical value derived through a mathematical computation on the data in a data block. The size of the integrity metadata may also be recorded in the tape header.

In one embodiment, module 128 is responsible for determining integrity metadata for a data block and attaching the integrity metadata to the data block upon receiving a write command. The data and the attached integrity metadata are then stored together on the tape. Subsequently, when a read command is generated, module 128 is responsible for comparing the attached integrity metadata with new integrity metadata to detect any errors occurred since the data block was written to the tape. The errors could occur due to firmware bugs, unprotected cache memories, bus errors, etc. and are unknown to the storage system 100.

Figure 2:
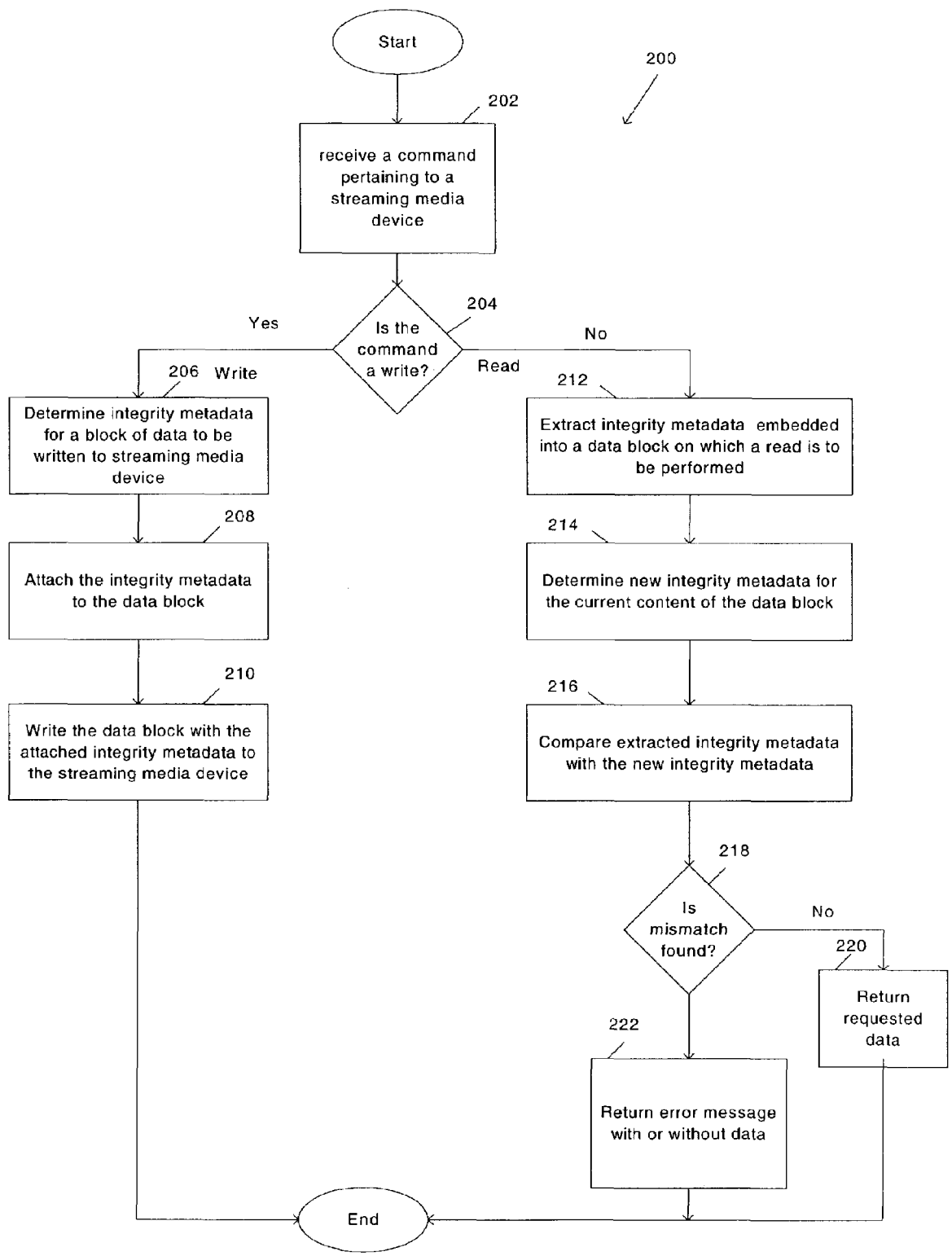
FIG. 2 is a flow diagram of one embodiment of a method for detecting errors in streaming media devices.

FIG. 2 is a flow diagram of one embodiment of a method 200 for detecting errors in streaming media devices. The method may be performed by processing logic that may comprise hardware (e.g., circuitry, dedicated logic, etc.), software (such as run on a general purpose computer system or a dedicated machine), or a combination of both.

Method 200 begins with processing logic receiving a command pertaining to a streaming media device such as a magnetic-tape storage device (processing block 202) and determining whether this command is a write or read command (decision box 204). The streaming media device stores data using extended data blocks. That is, each block of the streaming media device includes a data portion to store the actual data and an integrity metadata portion to store integrity metadata associated with the data stored in the data portion. In one embodiment, the size of the data portion and the size of the integrity metadata are recorded in the header of the streaming media device.

If the command received at processing block 204 is a write command, processing logic determines integrity metadata for a block of data to be written to the streaming media device (processing block 206). In one embodiment, the integrity metadata is a logical block address to be used for writing the block of data to the streaming media device. In another embodiment, the integrity metadata is a checksum calculated for the data block.

Next, processing logic attaches the integrity metadata to the block of data (processing block 208). Afterwards, the data block with the attached integrity metadata is written to the streaming media device (processing block 210). The attached integrity metadata is used to detect errors in the streaming media device when receiving a command to read this block of data.

Referring now to a read command logic, if the command received at processing block 204 is a read command, processing logic extracts integrity metadata embedded into a data block on which a read is requested (processing block 212), determines new integrity metadata for the current content of the data block (processing block 214), and compares the extracted integrity metadata with the new integrity metadata (processing block 216). If the extracted integrity metadata match the new integrity metadata (decision box 218), processing logic returns the requested data (processing block 220). Alternatively, if a mismatch between the new integrity metadata and the extracted integrity metadata is found, then this mismatch indicates that this data block may have been corrupted between the time the data block was written to the storage medium and the present time. Accordingly, processing logic returns an error message with or without the data (processing block 222).

As discussed above, in one embodiment, integrity metadata is a checksum calculated for a specific data block. The strength of a checksum determines how likely it is that a data block experiencing a typical type of error will result in a data block with an identical checksum. Checksums are calculated using algorithms that may very from simple algorithms (e.g., an XOR checksum algorithm) to more complex algorithms (e.g., a Fletcher-32 checksum algorithm). If the size of a data block is large, which is typical for a magnetic-tape storage device (e.g., a tape may have 4-KB data blocks), a simple checksum algorithm that works well for a smaller data block (e.g., a 512-byte data block) may not provide a sufficiently strong checksum. The use of a complex checksum algorithm, however, may be costly due to expensive computations involved. One embodiment of a present invention provides a solution that allows the use of simple integrity metadata algorithms while providing a reliable means for detecting errors in data storage devices with large data blocks. This solution can also be used for tapes having data blocks varying in size.

Figure 3A:
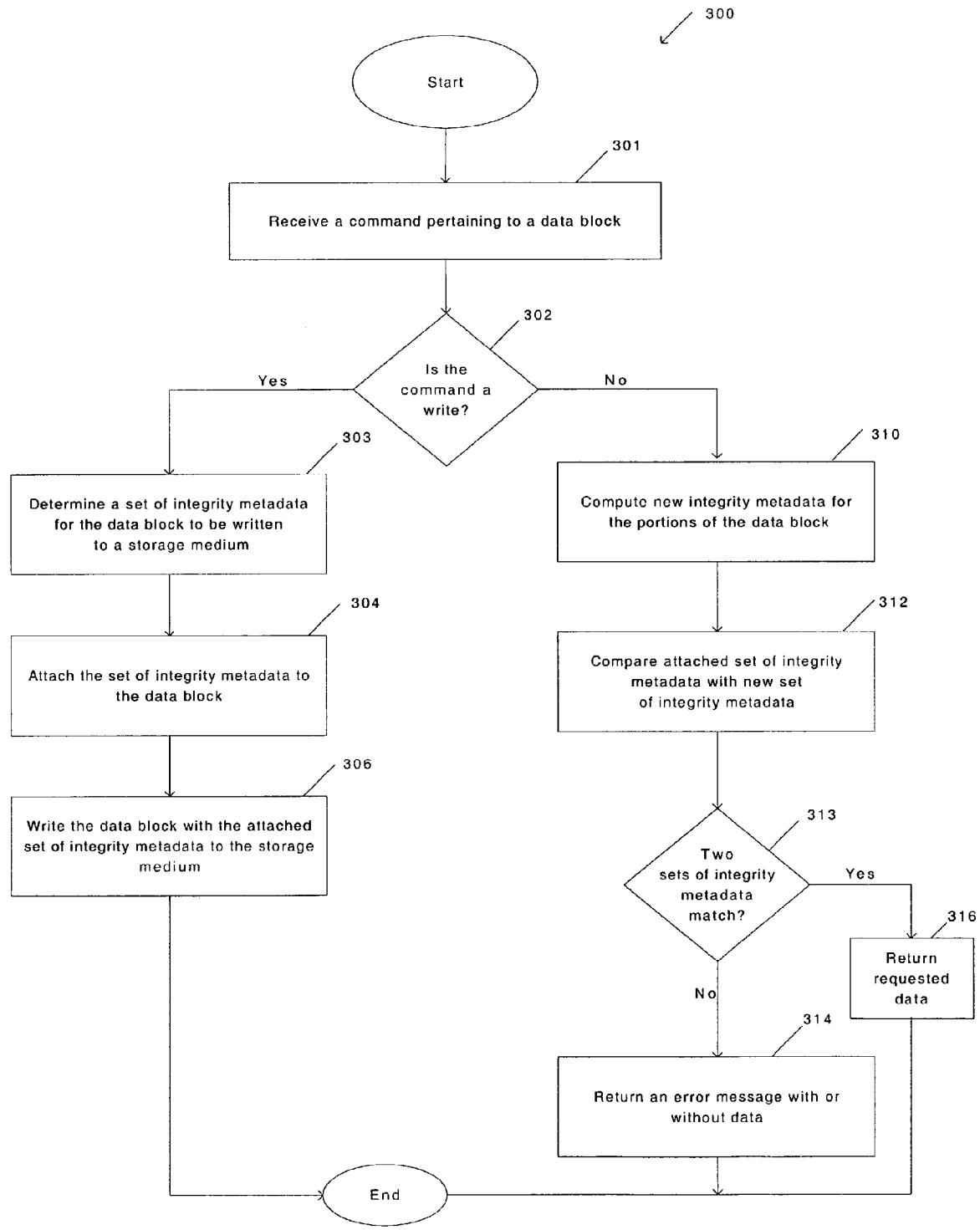
FIG. 3A is a flow diagram of one embodiment of a method for detecting errors in data storage devices.

FIG. 3A is a flow diagram of one embodiment of a method 300 for detecting errors in data storage devices. The method may be performed by processing logic that may comprise hardware (e.g., circuitry, dedicated logic, etc.), software (such as run on a general purpose computer system or a dedicated machine), or a combination of both.

Method 300 begins with processing logic receiving a command pertaining to a data block (processing block 301) and determining whether this command is a command to write the data block to a storage medium (decision box 302). The storage medium may be, for example, a magnetic tape, one or more disks, etc. If the determination made at decision box 302 is positive, processing logic determines a set of integrity metadata (e.g., a set of logical block addresses or a set of checksums) for this data block (processing block 303). Each integrity metadata within the set is calculated for a specific portion of the data block. That is, the data block is divided into portions, and each portion corresponds to a particular integrity metadata value. For example, a 4-KB data block may be divided into 8 units, 0.5 KB each. In one embodiment, sizes of data block portions and corresponding integrity metadata items are recorded within the storage medium (e.g., in the header of a tape).

Next, processing logic attaches the set of integrity metadata to the data block (processing block 304) and writes the data block with the attached set of integrity metadata to the storage medium (processing block 306).

If the command pertaining to the data block is a read command, processing logic computes new integrity metadata values for the portions of the data block (processing block 310) and compares the attached integrity metadata values with the new integrity metadata values (processing block 312). If the two sets match (decision box 313), processing logic returns the requested data (processing box 316). Otherwise, processing logic returns an error message with or without the corrupted data (processing block 314). In one embodiment, processing logic returns an error message as soon as it detects a first mismatch between the two integrity metadata values of the same data block portion. Alternatively, processing logic checks all integrity metadata values and returns an error message identifying the data block portions that are corrupted.

Figure 3B:
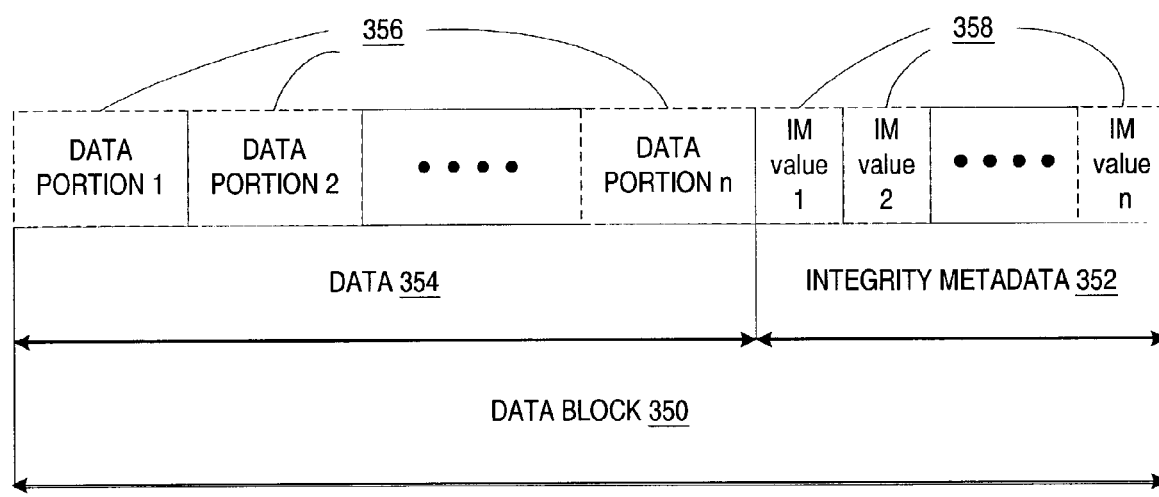
FIG. 3B illustrates an exemplary data block including a set of integrity metadata.

FIG. 3B illustrates an exemplary data block 350 of a storage medium such as a magnetic tape, a virtual tape, one or more disk drives, etc. The data block 350 includes data 354 and integrity metadata 352 attached to the data 354. The data 354 is divided into n data portions 356. Each data portion 356 corresponds to a metadata value 358 (i.e., data portion 1 corresponds to metadata value 1, data portion 2 corresponds to metadata value 2, etc.). The metadata values 358 were calculated when the data 354 was written to the storage medium. If a command to read the data 354 is received, new metadata values will be calculated for data portions 356 for comparing with the existing metadata values 358. If each new metadata value matches the corresponding existing metadata value 358, the data 354 is returned. If there is a mismatch in any pair of corresponding metadata values, an error code is returned as discussed above.

One embodiment of a mechanism for restoring a file using multiple backup copies made by a backup application will now be described.

Figure 4:
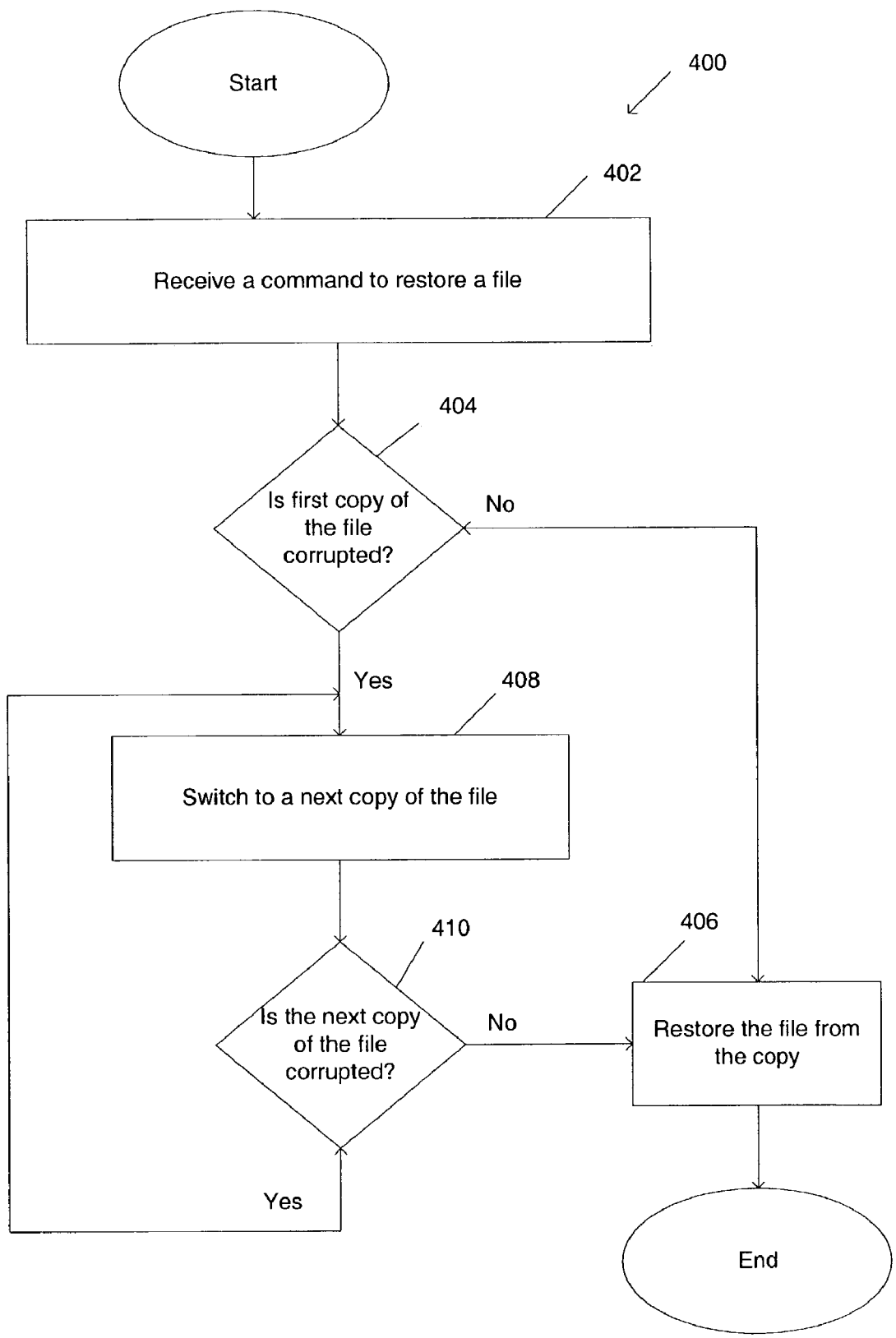
FIG. 4 is a flow diagram of one embodiment of a method for restoring a file using multiple backup copies.

FIG. 4 is a flow diagram of one embodiment of a method 400 for restoring a file using multiple backup copies. The method may be performed by processing logic that may comprise hardware (e.g., circuitry, dedicated logic, etc.), software (such as run on a general purpose computer system or a dedicated machine), or a combination of both. Processing logic may be implemented in a backup application and/or a tape drive.

Method 400 begins with processing logic receiving a command to restore a file using multiple backup copies previously made by a backup application (processing block 402). In response, processing logic determines whether any portion of a first copy is corrupted using a corresponding attached set of integrity metadata (e.g., a set of checksums) (decision box 404). If the first copy of the file is not corrupted, processing logic restores the file from this copy (processing logic 406). Otherwise, if the first copy is corrupted, processing logic refuses to read the corrupted copy and automatically switches to a next copy of the file (processing block 408). The switching continues until processing logic finds an uncorrupted copy of the file (decision box 410) which is then used to restore the file (processing block 406).

It should be noted that the technique of method 400 may be used to recover entire files as discussed above, as well as portions of files without loss of generality.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
receiving a read command pertaining to a first backup copy of a data block, the first backup copy being stored on a streaming media device;
comparing existing integrity metadata embedded into the first backup copy with new integrity metadata;
generating an error message if the existing integrity metadata does not match the new integrity metadata; and
reverting to one or more next backup copies of the data block until finding a backup copy thereof for which computed new integrity metadata matches embedded integrity metadata of the respective backup copy of the data block.

2. The method of claim 1 further comprising:
extracting the existing metadata embedded into the first backup copy of the data block.

3. The method of claim 1 wherein the existing integrity metadata is a checksum computed for the first backup copy of the data block when the first backup copy of the data block was written to the streaming media device.

4. The method of claim 3 further comprising:
computing the new integrity metadata for the first backup copy of the data block after receiving the read command.

5. The method of claim 1 wherein:
the existing integrity metadata is a logical block address that was used for writing the first backup copy of the data block to the streaming media device; and
the new integrity metadata is a logical block address used to retrieve the first backup copy of the data block from the streaming media device in response to the read command.

6. A method, comprising:
receiving a write command to write a data block to a streaming media device;
attaching integrity metadata to each of multiple copies of the data block; and
writing the multiple copies of the data block, each with the attached integrity metadata, to the streaming media device, the attached integrity metadata being subsequently used to detect an error by iteratively comparing the attached integrity metadata with newly computed integrity metadata for a corresponding one of the multiple copies of the data block until finding one of said copies for which the attached integrity metadata matches its newly computed integrity metadata.

7. The method of claim 6 wherein the integrity metadata is a checksum.

8. The method of claim 7 further comprising computing the integrity metadata upon receiving the write command.

9. The method of claim 6 wherein the integrity metadata is a logical block address used to write the multiple copies of the data block to the streaming media device.

10. The method of claim 6 wherein the attached integrity metadata of the copies of the data block is compared with corresponding new integrity metadata upon receiving a read command pertaining to the data block.

11. A method, comprising:
determining a set of integrity metadata for a data block representing a file to be written to a storage medium, each integrity metadata within the set of metadata corresponding to a certain portion of the data block;
attaching the set of integrity metadata to the data block;
writing multiple copies of the data block, each with the attached set of integrity metadata, to the storage medium,
receiving a command to restore the file;
determining, using a corresponding attached set of the integrity metadata, whether a first copy of the file is corrupted; and,
if so, automatically switching to one or more next copies of the file until finding an uncorrupted copy of the file, and restoring the file using the uncorrupted copy.

12. The method of claim 11 wherein the storage medium represents at least one of a disk storage device and a tape storage device.

13. The method of claim 11 wherein the set of integrity metadata includes a checksum computed for each portion of the data block.

14. The method of claim 13 wherein each portion of the data block has a predefined size.

15. The method of claim 11 wherein determining whether the first copy of the file is corrupted comprises:
re-calculating a new set of integrity metadata for the data block stored on the storage medium upon receiving a read command pertaining to the data block;
comparing the new set of integrity metadata with the attached set of integrity metadata; and
generating an error message if the new set of integrity metadata does not match the attached set of integrity metadata.

16. The method of claim 11 wherein determining whether the first copy of the file is corrupted comprises:
re-computing a new set of integrity metadata for the first copy of the file; and
comparing the new set of integrity metadata with the attached set of integrity metadata.

17. A machine-readable medium containing executable instructions which, when executed by a processing system, cause the processing system to perform a method, the method comprising:
receiving a read command pertaining to a first backup copy of a data block, the first backup copy being stored on a streaming media device;
comparing existing integrity metadata embedded into the first backup copy with new integrity metadata;
generating an error message if the existing integrity metadata does not match the new integrity metadata; and
reverting to one or more next backup copies of the data block until finding a backup copy thereof for which computed new integrity metadata matches embedded integrity metadata of the respective backup copy of the data block.

18. A machine-readable medium containing executable instructions which, when executed by a processing system, cause the processing system to perform a method, the method comprising:
receiving a write command to write a data block to a streaming media device;
attaching integrity metadata to each of multiple copies of the data block; and
writing the multiple copies of the data block, each with the attached integrity metadata, to the streaming media device, the attached integrity metadata being subsequently used to detect an error by iteratively comparing the attached integrity metadata with newly computed integrity metadata for a corresponding one of the multiple copies of the data block until finding one of said copies for which the attached integrity metadata matches its newly computed integrity metadata.

19. A machine-readable medium containing executable instructions which, when executed by a processing system, cause the processing system to perform a method, the method comprising:
determining a set of integrity metadata for a data block representing a file to be written to a storage medium, each integrity metadata within the set of metadata corresponding to a certain portion of the data block;
attaching the set of integrity metadata to the data block;
writing multiple copies of the data block, each with the attached set of integrity metadata, to the storage medium, receiving a command to restore the file;
determining, using a corresponding attached set of the integrity metadata, whether a first copy of the file is corrupted; and,
if so, automatically switching to one or more next copies of the file until finding an uncorrupted copy of the file, and restoring the file using the uncorrupted copy.

20. An apparatus comprising:
means for receiving a read command pertaining to a first backup copy of a data block, the first backup copy being stored on a streaming media device;
means for comparing existing integrity metadata embedded into the first backup copy with new integrity metadata;
means for generating an error message if the existing integrity metadata does not match the new integrity metadata; and
means for reverting to one or more next backup copies of the data block until finding a backup copy thereof for which computed new integrity metadata matches embedded integrity metadata of the respective backup copy of the data block.

21. An apparatus comprising:
means for receiving a write command to write a data block to a streaming media device;
means for attaching integrity metadata to each of multiple copies of the data block; and
means for writing the multiple copies of the data block, each with the attached integrity metadata, to the streaming media device, the attached integrity metadata being subsequently used to detect an error by iteratively comparing the attached integrity metadata with newly computed integrity metadata for a corresponding one of the multiple copies of the data block until finding one of said copies for which the attached integrity metadata matches its newly computed integrity metadata.

22. An apparatus comprising:
means for determining a set of integrity metadata for a data block representing a file to be written to a storage medium, each integrity metadata within the set of metadata corresponding to a certain portion of the data block;

means for attaching the set of integrity metadata to the data block;

means for writing multiple copies of the data block, each with the attached set of integrity metadata, to the storage medium, means for receiving a command to restore the file; and means for determining, using a corresponding attached set of the integrity metadata, whether a first copy of the file is corrupted; and, if so, automatically switching to one or more next copies of the file until finding an uncorrupted copy of the file, and restoring the file using the uncorrupted copy.

23. A data processing system comprising:

a processing system; and a memory coupled to the processing system, the memory storing instructions, which when executed by the processing system, cause the processing system to perform the operations of a) receiving a read command pertaining to a first backup copy of a data block, the first backup copy being stored on a streaming media device; b) comparing existing integrity metadata embedded into the first backup copy with new integrity metadata; c) generating an error message if the existing integrity metadata does not match the new integrity metadata; and d) reverting to one or more next backup copies of the data block until finding a backup copy thereof for which computed new integrity metadata matches embedded integrity metadata of the respective backup copy of the data block.

24. A data processing system comprising:

a processing system; and a memory coupled to the processing system, the memory storing instructions, which when executed by the processing system, cause the processing system to perform the operations of a) receiving a write command to write a data block to a streaming media device; b) attaching integrity metadata to each of multiple copies of the data block; and c) writing the multiple copies of the data block, each with the attached integrity metadata, to the streaming media device, the attached integrity metadata being subsequently used to detect an error by iteratively comparing the attached integrity metadata with newly computed integrity metadata for a corresponding one of the multiple copies of the data block until finding one of said copies for which the attached integrity metadata matches its newly computed integrity metadata.

25. A data processing system comprising:

a processing system; and a memory coupled to the processing system, the memory storing instructions, which when executed by the processing system, cause the processing system to perform the operations of a) determining a set of integrity metadata for a data block representing a file to be written to a storage medium, each integrity metadata within the set of metadata corresponding to a certain portion of the data block; b) attaching the set of integrity metadata to the data block; c) writing multiple copies of the data block, each with the attached set of integrity metadata, to the storage medium, d) receiving a command to restore the file; and e) determining, using a corresponding attached set of the integrity metadata, whether a first copy of the file is corrupted; and, if so, automatically switching to one or more next copies of the file until finding an uncorrupted copy of the file, and restoring the file using the uncorrupted copy.

26. A data storage system comprising:

a plurality of streaming media devices; and a data processing system, coupled to the plurality of streaming media devices, the data processing system including a processing system and a memory coupled to the processing system, the memory storing instructions, which when executed by the processing system, cause the processing system to perform the operations of a) receiving a read command pertaining to a first backup copy of a data block, the first backup copy being stored on a streaming media device; b) comparing existing integrity metadata embedded into the first backup copy with new integrity metadata; c) generating an error message if the existing integrity metadata does not match the new integrity metadata; and d) reverting to one or more next backup copies of the data block until finding a backup copy thereof for which computed new integrity metadata matches embedded integrity metadata of the respective backup copy of the data block.

27. A data storage system comprising:

a plurality of streaming media devices; and a data processing system, coupled to the plurality of streaming media devices, the data processing system comprising a processing system, and a memory coupled to the processing system, the memory storing instructions, which when executed by the processing system, cause the processing system to perform the operations of a) receiving a write command to write a data block to a streaming media device; b) attaching integrity metadata to each of multiple copies of the data block; and c) writing the multiple copies of the data block, each with the attached integrity metadata, to the streaming media device, the attached integrity metadata being subsequently used to detect an error by iteratively comparing the attached integrity metadata with newly computed integrity metadata for a corresponding one of the multiple copies of the data block until finding one of said copies for which the attached integrity metadata matches its newly computed integrity metadata.

28. A data storage system comprising:

a plurality of storage devices; and a data processing system, coupled to the plurality of storage devices, the data processing system including a processing system, and a memory coupled to the processing system, the memory storing instructions, which when executed by the processing system, cause the processing system to perform the operations of a) determining a set of integrity metadata for a data block representing a file to be written to a storage medium, each integrity metadata within the set of metadata corresponding to a certain portion of the data block; b) attaching the set of integrity metadata to the data block; c) writing multiple copies of the data block, each with the attached set of integrity metadata, to the storage medium, d) receiving a command to restore the file; and e) determining, using a corresponding attached set of the integrity metadata, whether a first copy of the file is corrupted; and, if so, automatically switching to one or more next copies of the file until finding an uncorrupted copy of the file, and restoring the file using the uncorrupted copy.

* * * * *